(12) United States Patent
White et al.

(10) Patent No.: US 10,948,296 B2
(45) Date of Patent: Mar. 16, 2021

(54) INTERLACED SPIRAL OPTICAL GYROSCOPE

(71) Applicant: California Institute of Technology, Pasadena, CA (US)

(72) Inventors: Alexander D. White, Pasadena, CA (US); Parham Porsandeh Khial, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 12 days.

(21) Appl. No.: 16/530,444

(22) Filed: Aug. 2, 2019

(65) Prior Publication Data

US 2020/0041270 A1    Feb. 6, 2020

Related U.S. Application Data

(60) Provisional application No. 62/713,653, filed on Aug. 2, 2018.

(51) Int. Cl.
*G01C 19/72* (2006.01)
*G01C 19/66* (2006.01)
*H01S 3/067* (2006.01)

(52) U.S. Cl.
CPC ......... *G01C 19/728* (2013.01); *G01C 19/661* (2013.01); *G01C 19/721* (2013.01); *H01S 3/06795* (2013.01)

(58) Field of Classification Search
CPC .. G01C 19/728; G01C 19/661; G01C 19/721; G01C 19/722; G01C 19/667; H01S 3/06795
See application file for complete search history.

(56) References Cited

U.S. PATENT DOCUMENTS

2003/0053067 A1    3/2003  Hashimoto
2009/0046294 A1*   2/2009  Kaplan ............. G02B 6/12004
                                                            356/460
(Continued)

FOREIGN PATENT DOCUMENTS

WO    WO 2017/138884 A1    8/2017

OTHER PUBLICATIONS

WIPO Application No. PCT/US2019/044794, International Search Report and Written Opinion of the International Searching Authority, dated Apr. 28, 2020.
(Continued)

*Primary Examiner* — Hwa Andrew Lee
(74) *Attorney, Agent, or Firm* — Alston & Bird LLP

(57) ABSTRACT

An optical gyroscope includes, in part, an optical switch, a pair of spiral optical rings and a pair of photodetectors. The optical switch supplies a laser beam. The first spiral optical ring delivers a first portion of the beam in a clockwise direction during the first half of a period, and a first portion of the beam in a counter clockwise direction during the second half of the period. The second spiral optical ring delivers a second portion of the beam in a counter clockwise direction during the first half of the period, and a second portion of the beam in a clockwise direction during the second half of the period. The first photodetector receives the beams delivered by the first and second optical rings during the first half of the period. The second photodetector receives the beams delivered by the first and second optical rings during the second half of the period.

16 Claims, 4 Drawing Sheets

(56) References Cited

U.S. PATENT DOCUMENTS

2013/0088720 A1 4/2013 Sorrentino et al.
2018/0356229 A1 12/2018 Porsandeh Khial et al.

OTHER PUBLICATIONS

Khial et al., "Nanophotonic optical gyroscope with reciprocal sensitivity enhancement," Nature Photonics, 12:671-675, (2018). [Retrieved from the Internet: <URL: https://chic.caltech.edu/wp-content/uploads/2018/11/Nanophotonic-Gyro-Final.pdf>].

* cited by examiner

INTERLACED SPIRAL OPTICAL GYROSCOPE

CROSS REFERENCE TO RELATED APPLICATIONS

The present application claims benefit under 35 USC 119(e) of Application Ser. No. 62/713,653 filed Aug. 2, 2018, the content of which is incorporated herein by reference in its entirety.

FIELD OF THE INVENTION

The present invention relates to a gyroscope, and more particularly to an optical gyroscope.

BACKGROUND OF THE INVENTION

Gyroscopes are used in a variety of devices, such as smartphones, cars, aircrafts and the like for navigation. As is known, a tradeoff exists between the accuracy of a gyroscope and its size. For example, ring laser gyroscopes or fiber optic gyroscopes with relatively high accuracy are expensive and bulky. Micro electro-mechanical systems (MEMS) based gyroscopes are relatively small but lack precision.

Fiber-optic gyroscopes measure their rate of rotation by measuring the relativistic Sagnac effect. The Sagnac effect causes propagating light to experience a time shift proportional to the rate of rotation of its inertial frame. Therefore, if light is sent in two directions around a rotating closed path, the two beams will experience different phase shifts as they reach the other side. By measuring this phase shift, the rotational velocity may be calculated.

Conventional gyroscopes are highly sensitive to fluctuations in temperature, laser frequency, phase, and back reflection. To mitigate these effects, the single bi-directional path can be replaced by two paths and a switching system. By sending an optical signal in two separate and opposite paths and switching the direction of propagation in these two paths, the sign of the Sagnac effect will change but the thermal, frequency, and back reflection effects will remain the same. Thus, by measuring the signal at the switching frequency, the lower frequency fluctuations and drifts may be filtered out.

Conventional benchtop laser-based gyroscopes require high precision alignment, clean medium and a high-quality laser source to detect small phase shift (due to Sagnac effect) and to minimize noise. A need continues to exist for an improved optical gyroscope.

BRIEF SUMMARY OF THE INVENTION

An optical gyroscope, in accordance with one embodiment of the present invention, includes, in part, an optical switch adapted to deliver a laser beam to a first path during a first half of a period and to a second path during a second half of the period, a first spiral optical ring configured to deliver a first portion of the beam received from the first path in a clockwise direction during the first half of the period and further to deliver a first portion of the beam received from the second path in a counter clockwise direction during the second half of the period, a second spiral optical ring configured to deliver a second portion of the beam received from the first path in a counter clockwise direction during the first half of the period and further to deliver a second portion of the beam received from the second path in a clockwise direction during the second half of the period. The first and second spiral optical rings are interlaced.

In one embodiment, the optical gyroscope further includes, in part, a first photodetector adapted to receive a portion of the beams delivered by the first and second optical rings during the first half of the period. In one embodiment, the optical gyroscope further includes, in part, a second photodetector adapted to receive a portion of the beams delivered by the first and second optical rings during the second half of the period.

In one embodiment, the optical gyroscope further includes, in part, a first trans-impedance amplifier adapted to amplify an output signal of the first photodetector by a first amplification value. In one embodiment, the optical gyroscope further includes, in part, a second trans-impedance amplifier adapted to amplify an output signal of the second photodetector by a second amplification value. In one embodiment, the optical gyroscope further includes, in part, a signal combiner adapted to generate a first signal representative of a combined outputs of the first and second trans-impedance amplifiers.

In one embodiment, the optical gyroscope includes, in part, one or more heating elements adapted to tune the spiral optical rings. In one embodiment, the heating elements are resistive heating elements integrated with the first and second optical spiral rings. In one embodiment, the signal combiner is adapted to add output signals of the first and second trans-impedance amplifiers. In one embodiment, the optical switch includes a Mach Zehnder interferometer.

A method of determining a degree of orientation about an axis, in accordance with one embodiment of the present invention, includes, in part, delivering a laser beam to a first path during a first half of a period and to a second path during a second half of the period, delivering a first portion of the beam received from the first path to a first spiral optical ring in a clockwise direction during the first half of the period, delivering a first portion of the beam received from the second path to the first spiral optical ring in a counter clockwise direction during the second half of the period, delivering a second portion of the beam received from the first path to a second spiral optical ring in a counter clockwise direction during the first half of the period, delivering a second portion of the beam received from the second path to the second spiral optical ring in a clockwise direction during the second half of the period, detecting the beams delivered by the first and second spiral optical rings during the first half of the period to generate a first signal, and detecting the beams delivered by the first and second spiral optical rings during the second half of the period to generate a second signal. The first and second spiral optical rings are interlaced with one another.

In one embodiment, the method further includes, in part, amplifying the first signal by a first amplification value to generate a first amplified signal, and amplifying the second signal by a second amplification value to generate a second amplified signal. In one embodiment, the method further includes, in part, combining the first and second amplified signals to generate a combined signal. In one embodiment, the method further includes, in part, tuning the first and second spiral optical rings by applying heat. In one embodiment, the combining of the first and second amplified signals includes adding the first and second amplified signals.

DETAILED DESCRIPTION OF THE INVENTION

In accordance with embodiments of the present invention, a compact integrated optical gyroscope has a high precision, enhanced immunity to noise and fluctuations, withstands relatively large environmental drifts, and is relatively inexpensive to manufacture.

Figure 1A:
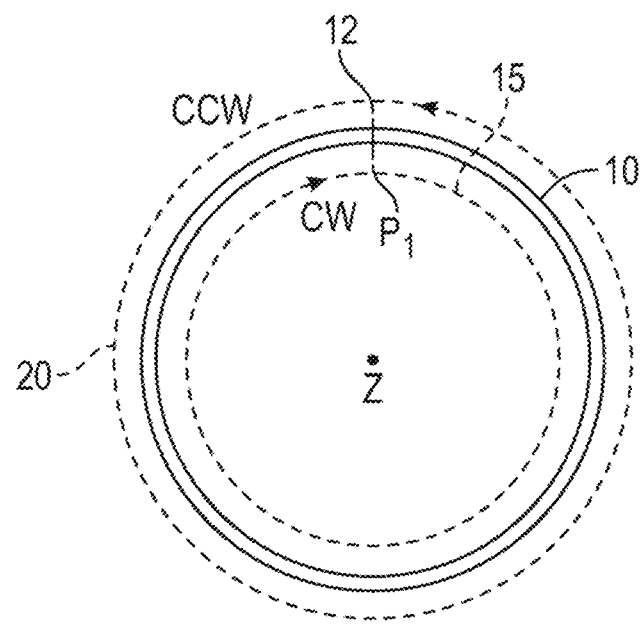
FIG. 1A shows an optical ring in a stationary state and disposed in a gyroscope, as known in the prior art.

FIG. 1A shows an optical ring 10 assumed to be a part of a gyroscope and adapted to be able to spin about the z axis (perpendicular to the plane of the page). Assume that two laser beams 15 and 20 enter the ring at entry point 12 at the same time. Assume further that beam 15 is caused to travel in a clockwise direction (CW) and beam 20 is caused to travel in a counter clockwise direction (CCW). If the force applied to the gyroscope does not cause ring 10 to rotate about the z-axis (thereby maintaining ring 10 in a stationary state) the position $P_1$ of entry point 12 does not change and therefore both beams 15 and 20 reach the entry point 12 at the same, as shown in FIG. 1A.

Figure 1B:
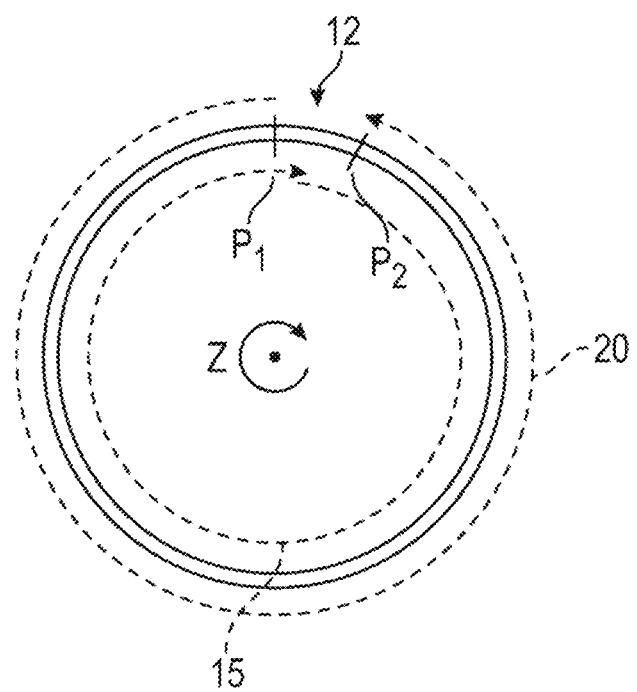
FIG. 1B shows the optical ring of FIG. 1 after rotating along the z-axis and in a counter clock-wise direction, as known in the prior art.

Assume, that due to an applied force, optical ring 10 is caused to rotate about the z-axis and in a CW direction, as shown in FIG. 1B, thereby causing a change in position of entry point 12 from $P_1$ to $P_2$. This causes beam 15 to travel a longer distance to reach position $P_2$ than it does beam 20. The extra distance traveled by beam 15 relative to beam 20 causes a time difference Δt defined by the following expression:

$$\Delta t \approx \frac{4\pi R^2 \omega}{C^2} = \frac{4A\omega}{C^2} \quad (1)$$

In equation (1), R, a and A respectively represent the radius, angular velocity and area of optical ring 10, and c represents the speed of light. By measuring the time difference Δt, the angular velocity a and hence the degree of orientation about the z-axis is determined. Although not shown, it is understood that a gyroscope has three such rings each adapted to rotate about one of the x, y and z axes.

Conventional optical gyroscopes suffer from a number of sources of noise, such as, for example, (i) thermal noise (thermal fluctuations) inside the waveguide or fiber thus inducing phase shift, (ii) fabrication mismatches, (iii) laser phase noise; and (iv) mode conversion inside the waveguide or fiber. An optical gyroscope, in accordance with embodiments of the present invention, minimizes the above sources of noise.

Figure 2:
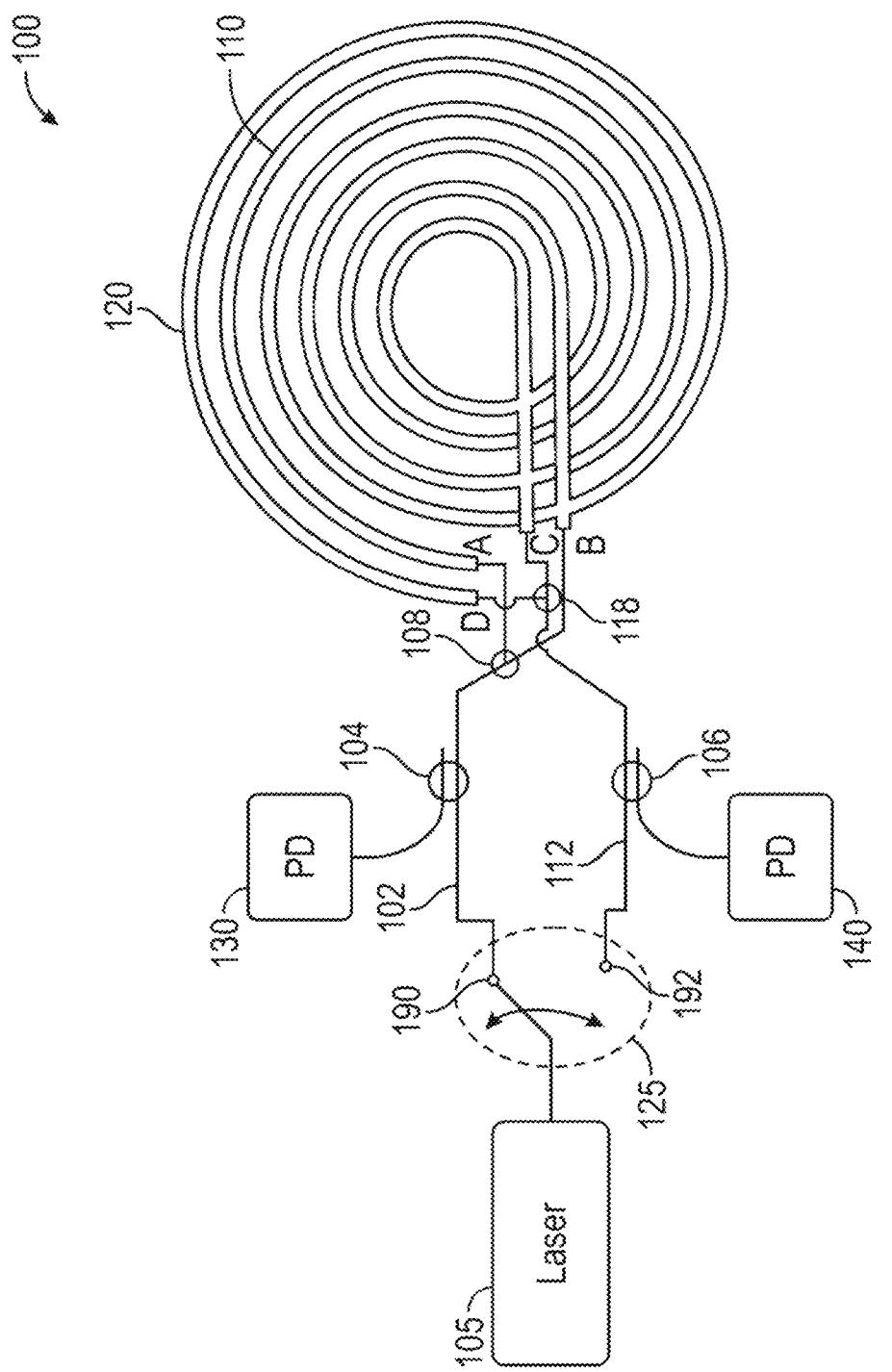
FIG. 2 is a simplified high-level block diagram of an optical gyroscope, in accordance with one embodiment of the present invention.

FIG. 2 is a simplified high-level block diagram of components of an optical gyroscope 100 adapted to detect the amount of spin or rotation about, e.g., the z-axis (perpendicular to the plane of the page), in accordance with one embodiment of the present invention. Although not shown, it is understood that optical gyroscope 100 also includes similar components adapted to detect the degree of rotations about both x and y axes. In one embodiment, all components of optical gyroscope 100 are integrated in a semiconductor substrate, such as Silicon.

The, e.g., z-axis components of optical ring 100 are shown as including, in part, an optical switch 125, first and second optical paths 102, 112, first and second optical spiral rings 110, 120, first, second, third and fourth optical splitters/couplers 104, 106, 108, 118, and first and second photodetectors 130, 140. Each of optical splitters/couplers 108, 118 is a 50/50 optical splitter/coupler. As is seen, spiral optical rings 110, 120 are interlaced. Although not shown, one or more integrated heaters may be used to heat optical rings.

The laser beam supplied by laser source 105 is delivered to optical switch 125 which has a switching frequency of $f_0$ defined by the period 1/T. During a first half of each such period T, switch 195 of optical switch 125 is placed in position 190 so as to deliver the laser beam to first optical path 102. During a second half of each such period, optical switch 125 is placed in position 192 so as to deliver the laser beam to second optical path 112.

The laser beam in path 102 (received during the first half of each period T) is delivered through splitter/coupler 108 to port A of optical spiral ring 110 and to port B of optical spiral ring 120. The beam delivered to optical spiral ring 110 travels in the clockwise (CW) direction and exits the optical spiral ring at its port C. The beam delivered to optical spiral ring 120 travels in a counter clock wise (CCW) direction and exits the optical spiral ring at its port D. The optical signals exiting ports C and D of optical spiral rings 110 and 120 respectively, are combined by optical coupler/splitter 118 and subsequently received by photodetector 140 via optical coupler 106.

The laser beam in path 112 (received during the first half of each period T) is delivered through splitter/coupler 118 to port C of optical ring 110 and to port D of optical ring 120. The beam delivered to optical ring 110 travels in the CCW direction and exits the optical ring at its port A. The beam delivered to optical ring 120 travels in a CW direction and exits the optical ring at its port B. The optical signals exiting ports A and B of optical rings 110 and 120 respectively, are combined by optical coupler/splitter 108 and subsequently received by photodetector 130 via optical coupler 104. Each of photodetectors 130, 140 is adapted to convert the received optical signal to an electrical current. The current levels generated by photodetectors 130, 140 are a measure of the phase shift.

When the direction of the coherent laser beam is switched between paths 102 and 112, in accordance with one aspect of the present invention, the common mode of the two output signals generated by photodetectors 130 and 140 capture the effect of fabrication mismatches, thermal noise, and other sources of mismatch. On the other hand, the differential mode of the two output signals generated by photodetectors 130 and 140 contains the information regarding the desired signal which is the phase shift due to spinning of the gyroscope. In other words, when the switching frequency of optical switch 125 is selected to be relatively high, noise contributions caused, for example, by phase shifts induced by thermal fluctuations (which are in the kHz range) as well as other non-idealities are canceled out. Moreover, because each spin axis of an optical gyroscope, in accordance with one aspect of the present invention, includes a pair of rings each enabling the beam to travel in one direction only, embodiments of the present invention inhibit back reflections of the beam due to non-ideal characteristics of the waveguides (or fiber) that is common in conventional gyroscopes.

Because optical spiral rings 110, 120 are interlaced spirals, as shown in FIG. 2, thermal tracking between their optical paths is substantially enhanced, thereby providing operating point stability. The interlaced spiral rings further maximize the area enclosed by the light and therefore minimize the impact of thermal and frequency drift. In other words, the use of spiral paths, in accordance with one embodiment of the present invention, enables a larger effective area enclosed by the paths as they can have a much longer path in the same surface area, in a manner similar to a high Q resonator. However, because spirals are non-resonant and thus have a linear phase response even with large-scale frequency and thermal drifts, these drifts have a much less significant effect on the system's operating point. In addition, using a no resonant sensor is more power efficient, as it does not need to be actively tuned. Using interlaced spirals provides for highly coupled thermal drift between the two paths, further hardening the system against environmental drifts. By using the same length in each path, the effect of large-scale frequency drift is substantially attenuated. In one embodiment, switch 125 is a Mach-Zehnder Interferometer (MZI) switch. The crossing between the spiral rings may be achieved in a number of ways, such as through the use of multi-layer semiconductor processing or by using directional couplers.

Figure 3:
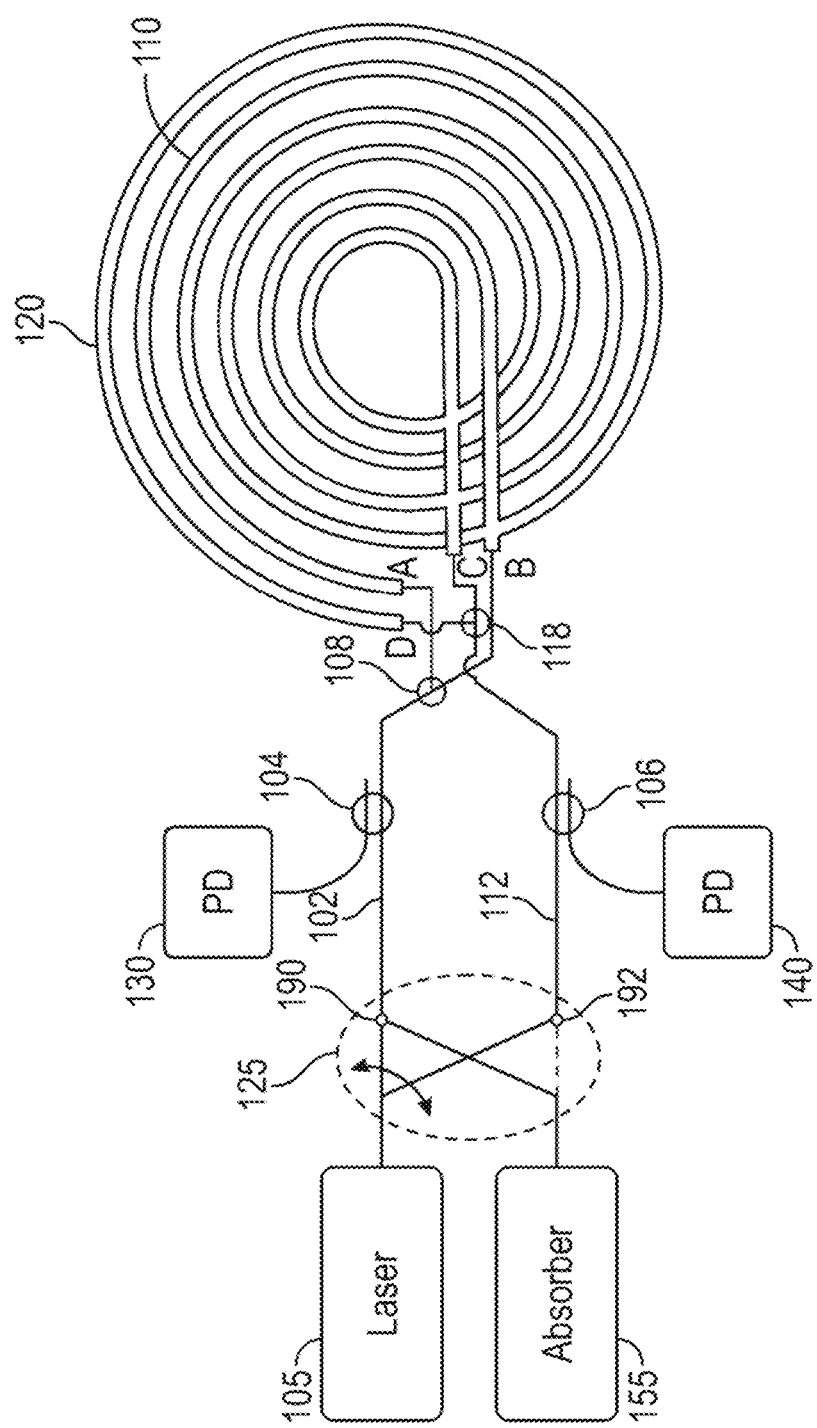
FIG. 3 is a simplified high-level block diagram of an optical gyroscope, in accordance with one embodiment of the present invention.

FIG. 3 is a simplified high-level block diagram of components of an optical gyroscope 200 adapted to detect the amount of spin or rotation about, e.g., the z-axis (perpendicular to the plane of the page), in accordance with another embodiment of the present invention. Although not shown, it is understood that optical gyroscope 200 also includes similar components adapted to detect the degree of rotations about both x and y axes. Optical gyroscope 200 is similar to optical gyroscope 100 except that optical gyroscope 200 includes an absorber 155. Absorber 155 is adapted to absorb the light exiting ports C and D (of spiral optical rings 110, 120) that is not coupled to photodetector 140. In a similar manner, absorber 155 is adapted to absorb the light exiting ports A and B (of spiral optical rings 110, 120) that is not coupled to photodetector 130. In one embodiment, absorber 155 is formed from Germanium. In one embodiment, all components of optical gyroscope 200 is integrated in a semiconductor substrate, such as Silicon.

Figure 4:
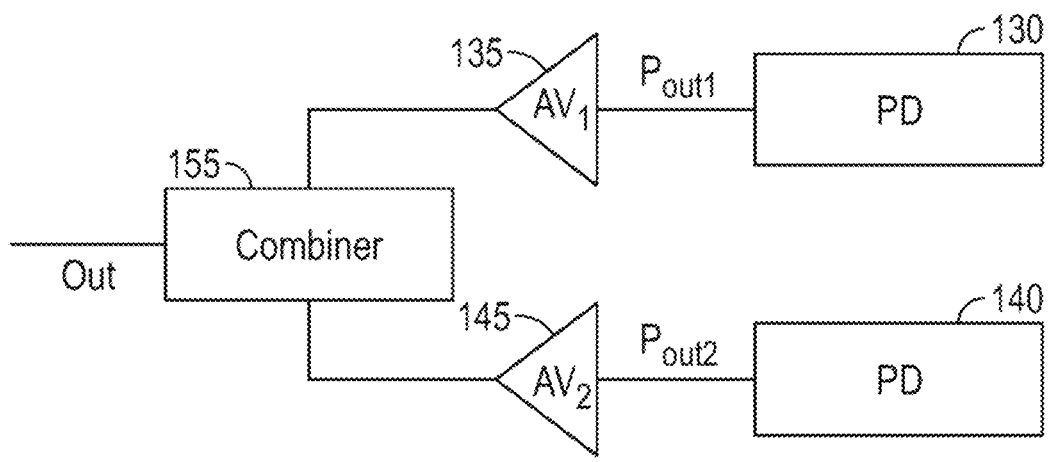
FIG. 4 is a simplified schematic block diagram of circuitry adapted to combine the outputs of the photo detectors of the optical gyroscopes shown in FIG. 2 or 3, in accordance with one embodiment of the present invention.

To account for non-ideal characteristics when detecting the phase shift caused by the Sagnac effect that the gyroscope is adapted to detect, in accordance with one aspect of the present invention, the output signal of each of photodetectors 130 and 140 is amplified by the gain of a trans-impedance amplifier before the two output signals are combined. FIG. 4 shows a simplified schematic block diagram of photodiodes 130 and 140 (see FIG. 3) whose outputs are amplified by trans-impedance amplifiers 135 and 145 respectively assumed to have gains of $A_{v1}$ and $A_{v2}$ respectively. The outputs of trans-impedance amplifiers 135 and 145 are received by and combined by combiner 155 to generate signal Out representative of the degree of rotation along, e.g., the z-axis, as described above. In one embodiment, combiner 155 adds the phase shift due to Sagnac effect (which is representative of the degree of rotation) to a base signal during a first half period of each cycle. The combiner subtracts the phase shift due to Sagnac effect from the base signal during a second half period of each cycle.

The above embodiments of the present invention are illustrative and not limitative. Other modifications and variations will be apparent to those skilled in the art and are intended to fall within the scope of the appended claims.

What is claimed is:

1. An optical gyroscope comprising:
   an optical switch adapted to deliver a laser beam to a first path during a first half of a period and to a second path during a second half of the period;
   a first spiral optical ring configured to deliver a first portion of the beam received from the first path in a clockwise direction during the first half of the period, and further to deliver a first portion of the beam received from the second path in a counter clockwise direction during the second half of the period;
   a second spiral optical ring configured to deliver a second portion of the beam received from the first path in a counter clockwise direction during the first half of the period, and further to deliver a second portion of the beam received from the second path in a clockwise direction during the second half of the period, wherein said first and second spiral optical rings are interlaced.

2. The optical gyroscope of claim 1 further comprising:
   a first photodetector adapted to receive a portion of the beams delivered by the first and second optical rings during the first half of the period.

3. The optical gyroscope of claim 2 further comprising:
   a second photodetector adapted to receive a portion of the beams delivered by the first and second optical rings during the second half of the period.

4. The optical gyroscope of claim 3 further comprising: a first trans-impedance amplifier adapted to amplify an output signal of the first photodetector by a first amplification value.

5. The optical gyroscope of claim 4 further comprising:
   a second trans-impedance amplifier adapted to amplify an output signal of the second photodetector by a second amplification value.

6. The optical gyroscope of claim 5 further comprising:
   a signal combiner adapted to generate a first signal representative of a combined outputs of the first and second trans-impedance amplifiers.

7. The optical gyroscope of claim 1 wherein the gyroscope comprises one or more heating elements adapted to tune the phases between the spiral optical rings.

8. The optical gyroscope of claim 7 wherein the one or more heating elements are resistive heating elements integrated with the optical gyroscope.

9. The optical gyroscope of claim 6 wherein said signal combiner is adapted to add output signals of the first and second trans-impedance amplifiers.

10. The optical gyroscope of claim 1 wherein said optical switch comprises a Mach Zehnder interferometer.

11. The optical gyroscope of claim 1 wherein the optical gyroscope is formed in a semiconductor substrate.

12. A method of determining a degree of orientation about an axis, the method comprising:
   delivering a laser beam to a first path during a first half of a period and to a second path during a second half of the period;
   delivering a first portion of the beam received from the first path to a first spiral optical ring in a clockwise direction during the first half of the period;
   delivering a first portion of the beam received from the second path to the first spiral optical ring in a counter clockwise direction during the second half of the period;

delivering a second portion of the beam received from the first path to a second spiral optical ring in a counter clockwise direction during the first half of the period;

delivering a second portion of the beam received from the second path to the second spiral optical ring in a clockwise direction during the second half of the period, wherein said first and second spiral optical rings are interlaced with one another;

detecting the beams delivered by the first and second spiral optical rings during the first half of the period to generate a first signal; and detecting the beams delivered by the first and second spiral optical rings during the second half of the period to generate a second signal.

13. The method of claim 12 further comprising:

amplifying the first signal by a first amplification value to generate a first amplified signal; and amplifying the second signal by a second amplification value to generate a second amplified signal.

14. The method of claim 13 further comprising:

combining the first and second amplified signals to generate a combined signal.

15. The method of claim 11 further comprising:

tuning the first and second spiral optical rings by applying heat.

16. The method of claim 14 wherein the combining of the first and second amplified signals comprises adding the first and second amplified signals 11.

\* \* \* \* \*